(12) United States Patent
Krishnan et al.

(10) Patent No.: US 11,567,927 B2
(45) Date of Patent: Jan. 31, 2023

(54) CREATING BLOCKS IN INSTANCE BLOCKCHAIN BASE ON A PROMISED BLOCK IN A GENERIC BLOCKCHAIN

(71) Applicant: Boardwalktech, Inc., Cupertino, CA (US)

(72) Inventors: Ganesh Krishnan, Cupertino, CA (US); Dharmesh Dadbhawala, San Jose, CA (US); Ashish Baluja, Santa Clara, CA (US); Bhaumik Dedhia, San Jose, CA (US)

(73) Assignee: BOARDWALKTECH, INC, Cupertino, CA (US)

( * ) Notice: Subject to any disclaimer, the term of this patent is extended or adjusted under 35 U.S.C. 154(b) by 296 days.

(21) Appl. No.: 16/574,553

(22) Filed: Sep. 18, 2019

(65) Prior Publication Data

US 2021/0081402 A1    Mar. 18, 2021

(51) Int. Cl.
   *G06F 16/00* (2019.01)
   *G06F 16/23* (2019.01)
   *G06F 16/18* (2019.01)

(52) U.S. Cl.
   CPC ...... *G06F 16/2379* (2019.01); *G06F 16/1805* (2019.01)

(58) Field of Classification Search
   CPC ........... G06F 16/2379; G06F 21/64; G06F 16/1805; H04L 63/12; H04L 2209/38; H04L 2209/56

USPC ....................................................... 707/703
See application file for complete search history.

(56) References Cited

U.S. PATENT DOCUMENTS

| | | | |
|---|---|---|---|
| 9,967,088 B2 * | 5/2018 | Ateniese | H04L 9/14 |
| 2016/0260095 A1 * | 9/2016 | Ford | G06F 21/64 |
| 2019/0074962 A1 * | 3/2019 | Ateniese | G06F 16/182 |
| 2019/0102850 A1 * | 4/2019 | Wheeler | G06Q 20/102 |
| 2020/0007322 A1 * | 1/2020 | Weldemariam | G06F 16/27 |

OTHER PUBLICATIONS

The Generic Blockchain Ecosystem and its Strategic Implications, Toias Riasanow et al., Twenty-fourth Americas Conference on Information Systems, New Orleans, 2018, pp. 1-10 (Year: 2018).*

* cited by examiner

*Primary Examiner* — Vincent F Boccio
(74) *Attorney, Agent, or Firm* — HM Law Group LLP; Vani Moodley, Esq.

(57) ABSTRACT

A system, method, and computer-readable storage medium is provided for creating first and second blockchain instances, each comprising representative blocks corresponding to steps in first and second multistep processes, respectively; performing a linking operation to link a block in the first blockchain instance to a block in the second blockchain instance; receiving change evidence data pertaining to steps in one of the first and second multi-step processes; and performing an update operation comprising updating one of the first and second blockchain instances based on said change evidence data.

19 Claims, 14 Drawing Sheets

Blockchain with State Transition Blocks (STB)

Finite Blockchain (FBC) with a single STB

Finite Blockchain (FBC)

CREATING BLOCKS IN INSTANCE BLOCKCHAIN BASE ON A PROMISED BLOCK IN A GENERIC BLOCKCHAIN

FIELD

Embodiments of the present invention relate to blockchain technology.

BACKGROUND

A blockchain may be used to operate a distributed digital ledger in which the records, called blocks, are linked using cryptography. Each block contains a cryptographic hash of the previous block, a timestamp, and transaction data.

A blockchain is "secure" because each block is encrypted and because once recorded in the ledger, transactions cannot be edited or deleted. A blockchain is "decentralized" because the data is spread across hundreds or thousands of nodes that are part of the network.

SUMMARY

A system, method, and computer-readable storage medium is provided for creating an instance blockchain and aligning the instance blockchain to a generic blockchain for tracking a multi-step process.

According to a first aspect of the invention, there is provided a method for a blockchain system performing by blockchain system, comprising: creating first and second blockchain instances, each comprising representative blocks corresponding to steps in first and second multistep processes, respectively; performing a linking operation to link a block in the first blockchain instance to a block in the second blockchain instance; receiving change evidence data pertaining to steps in one of the first and second multi-step processes; and performing an update operation comprising updating one of the first and second blockchain instances based on said change evidence data.

Other aspects of the invention will be apparent from the detailed description below.

DETAILED DESCRIPTION OF SOME EMBODIMENTS

Figure 1:
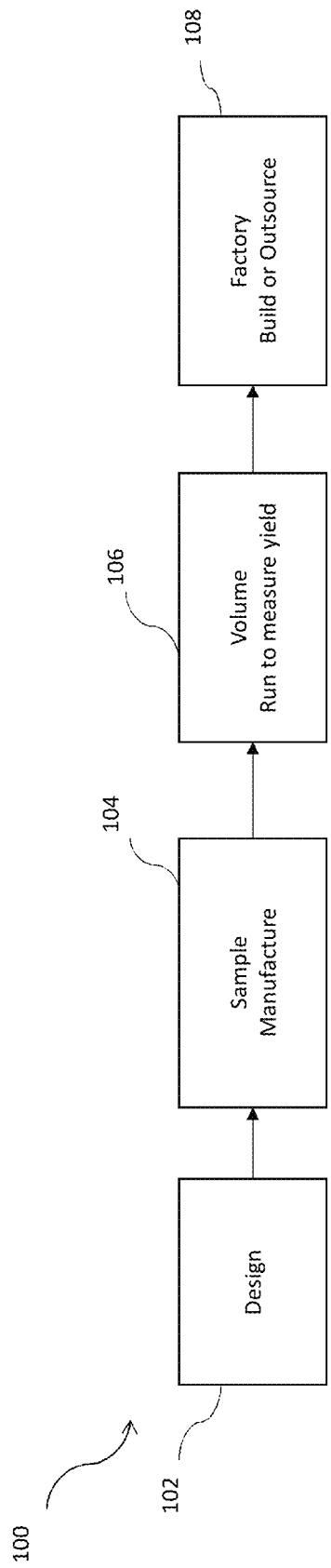
FIG. 1 illustrates a representative real-world process which can be advantageously managed, in accordance with embodiments of the present invention.

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention a system, method, and computer-readable storage medium for creating families of blockchains each comprising a generic finite blockchain and multiple instance blockchains. Each blockchain comprises a sequence of blocks corresponding to a multistep process. The generic finite blockchain associated with each family may include a sequence of steps chosen to represent an idealized execution path for the multistep process.

Aspects of the invention comprises performing by a blockchain system: accessing data for the creation of a block in a blockchain instance; comparing said data with data associated with a block in a generic blockchain; and for each block in the generic blockchain where the data in the block corresponds to the accessed data, creating a block in the blockchain instance for the accessed data; and performing an alignment operation to indicate that the created block is equivalent to the block in the generic blockchain.

Advantageously, the blockchain system may be operated in a first mode wherein blocks in a finite blockchain instance based on change evidence data; and in a 2nd mode wherein blocks in the finite block chain instance may be created based on a promised block in a generic finite blockchain.

The invention is to be construed broadly to include all manner of processes including, but not limited to chemical processes, approval processes management processes, etc.

For purposes of illustrating aspects of the invention, a business process will be described. Said business process may comprise a plurality of discrete steps which are to be performed in a serial manner. For example, consider the representative business process 100 shown in FIG. 1 which outlines a sequence of steps required to manufacture a new product. As will be seen, the sequence includes a design step 102, a sample manufacture step 104, a volume run step 106, and a factory build/outsource step 108. In step 102, a design is conceived for the product such as a new mobile phone, a new car, etc. In step 104, a sample manufacture or prototype is constructed based on the design. In step 106 a test volume of the product is manufactured in order to measure yield. For example, the step 106 may be applicable in the case of the manufacture of semiconductor chips where it is important to optimize a design to improve chip yields. Lastly, in step 108, a decision is made as to whether to build a factory to manufacture the product, or to outsource its manufacture to a third party.

Figure 2A:
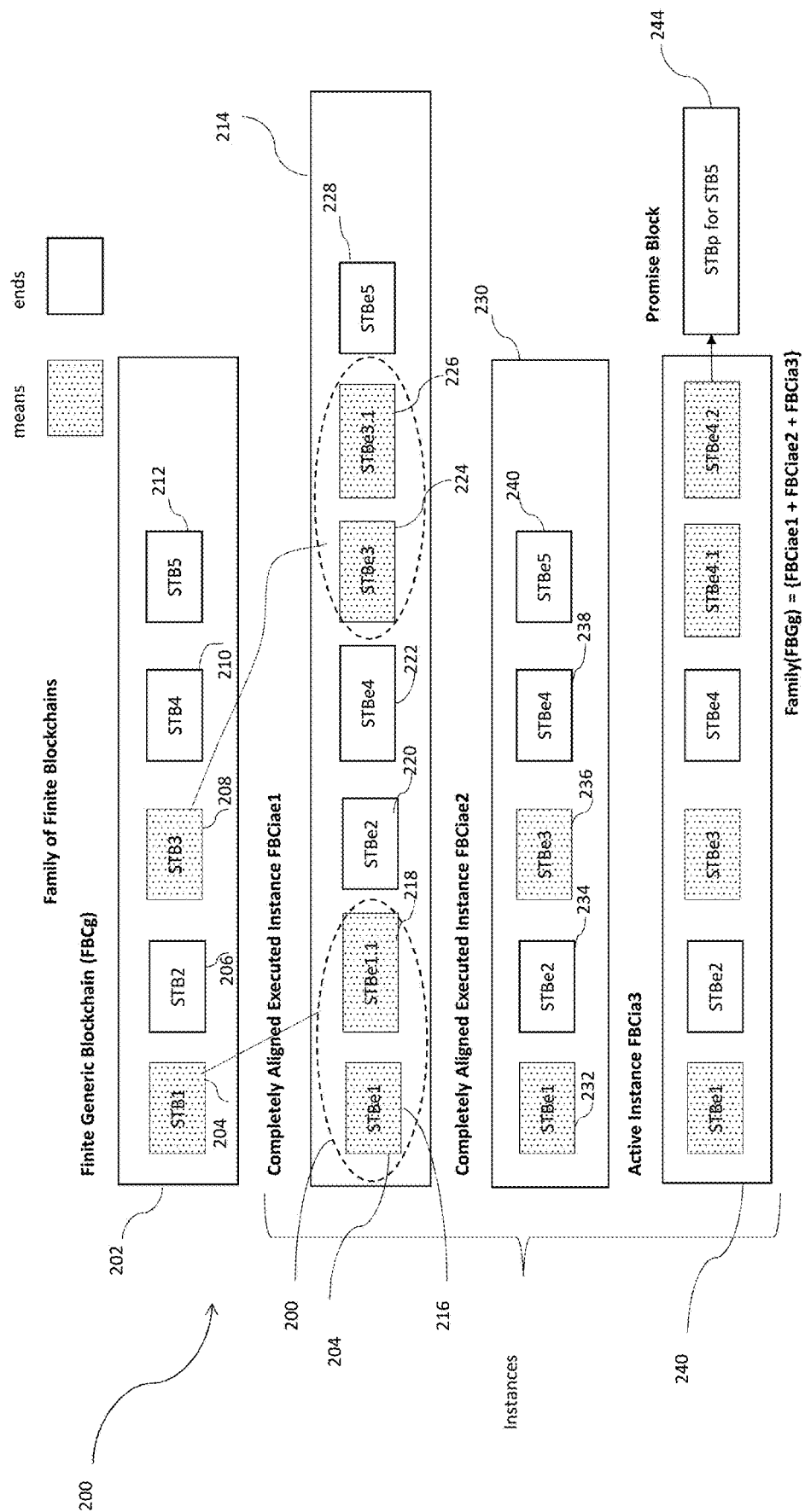
FIG. 2A illustrates a generic finite blockchain as well as finite block blockchain instances based on said generic finite blockchain, in accordance with one embodiment of the invention.

FIG. 2A of the drawings shows a family of finite blockchains 200 used to track a business process through to completion, in accordance with one embodiment of the invention. Referring to FIG. 2A, reference numeral 202 indicates a generic finite blockchain (FBCg) comprising a sequence of blocks 204 to 212. The blocks 204-212 may represent either a "Means" block or an "Ends" block. For example, blocks 204 and 208 represent Means blocks, whereas the blocks 206, 210, and 212 represents Ends blocks. An Ends block in a FBCg is a required block whereas, a Means block is an intermediate block that is optional in the FBCg and does not belong to a set of End blocks associated with the FBCg. The Means and Ends block within a FBCg may be indicated as FBCg (FBCg.{Means}, FBCg.{Ends}). Thus, a generic blockchain may be represented as {{Means}{Ends}}.

In one embodiment, the family of finite blockchains may be used to track the evolution of a system (business process) through a series of changes that are measured as a function of time such that at time T0, the genesis or the initial state of the system is recorded. This initial state may itself be considered a change. Every subsequent change transitions the system from its previous state to a following state. In one embodiment, every change is recorded as a block, which will be referred to herein as a "state transition block (STB)". In one embodiment, each block that is added to capture changes subsequent to the creation of the initial block, is linked to a previous block. Thus, the blocks representing state transitions are linked, hence the name "State Transition Blockchain". Referring to FIG. 2A, each of the blocks 204 to 212 represents a State Transition Block. In general terms, a system S may be described as a sequence of state transitions as follows: S={STB0+STB1+STB2+ . . . +STBn}.

In one embodiment, a STB may be authorized prior to its creation. Authorization may comprise requesting and receiving a tick from a Counter (C). In one embodiment, the Counter generates a tick t using the function gettick( ). In one embodiment, a Counter C, generates tick $t_{i+1}$>tick $t_i$, where $t_{i+1}$ was requested at a Time $T(t_{i+1})$>Time $T(t_i)$, when, tick $t_i$ was requested. A tick is a unit such that there exists a function to compare $t_{i+1}$ and $t_i$.

In many instances, a step in a process may require a certain effort for its completion. Said effort may be measured in terms of money, and other resources. Thus, in one embodiment an effort E indicates the resources required for the realization or completion of a particular step in a process. This effort E may be assigned as a requirement for the creation of a particular STB that is required to represent the particular step, in accordance with one embodiment of the invention.

In one embodiment, each STB representing a step in a process has associated with it, a set of minimum requirements for its creation. In some cases, an effort, and a tick define the minimum requirements.

Each blockchain may be bounded by two ticks, hence the term "finite blockchain". A finite blockchain may be represented as FBC (t1, tn) where t1 represents the first tick and tn represents the last tick in the chain. Alternatively, finite blockchain FBC (t1) indicates a tick t1 of a finite blockchain that contains a single STB.

In one embodiment, the generic finite blockchain 202 may be used to generate multiple instances of blockchains. Referring to FIG. 2A of the drawing's reference numerals 214, 230, and 240 indicate instances within a family of finite blockchains 200. Each instance blockchain may be instantiated in order to track an instance of the process defined in the generic blockchain 202 through to completion.

Figure 3:
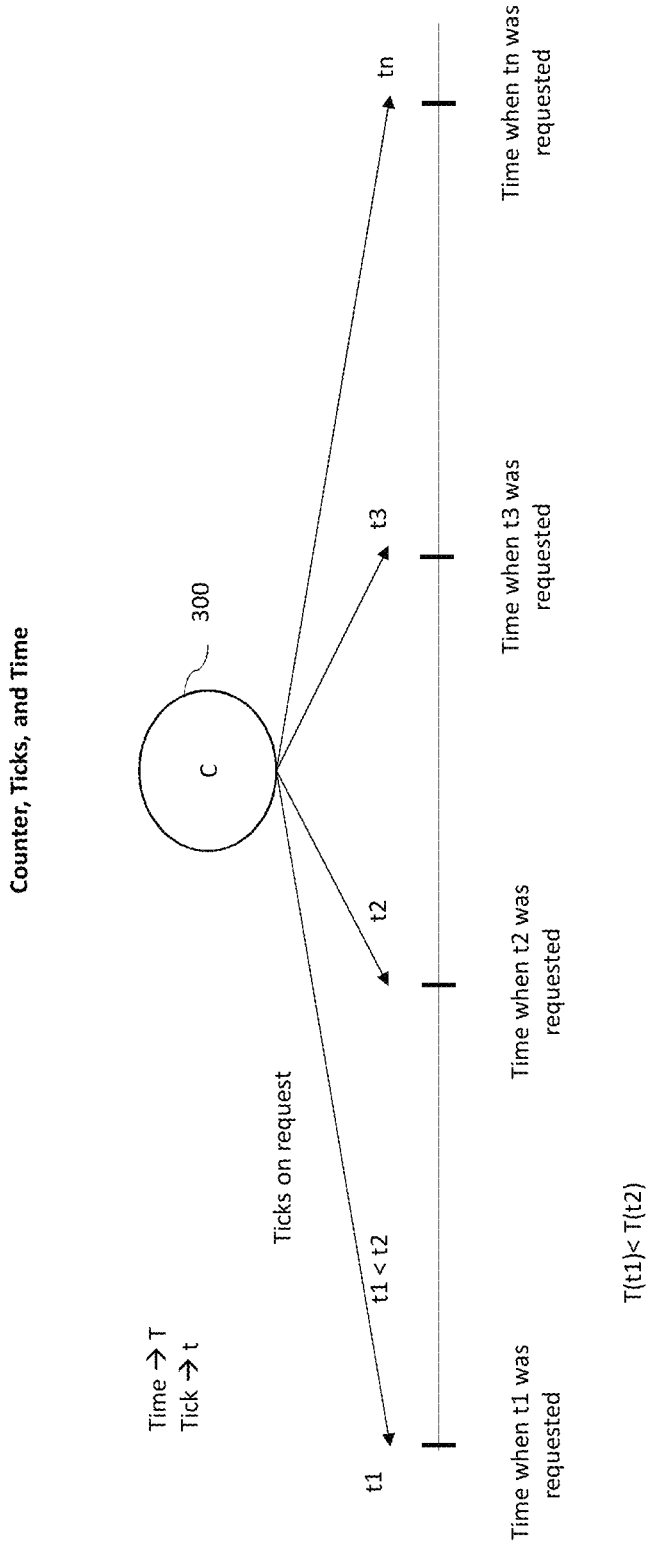
FIG. 3 illustrates how a counter may be used to issue ticks to create a finite blockchain, in accordance with one embodiment of the invention

Within each blockchain, the ticks associated with each of the STBs are referenced to a primary or base counter that is unique to the blockchain. FIG. 3 of the drawings illustrates the relationship between ticks and a base counter. Referring to FIG. 3, reference numeral 300 generally indicates a counter C which is used to assign ticks to blocks being created within a blockchain. As will be seen, the ticks t1, t2, . . . tn are issued in order of increasing time.

Figure 4:
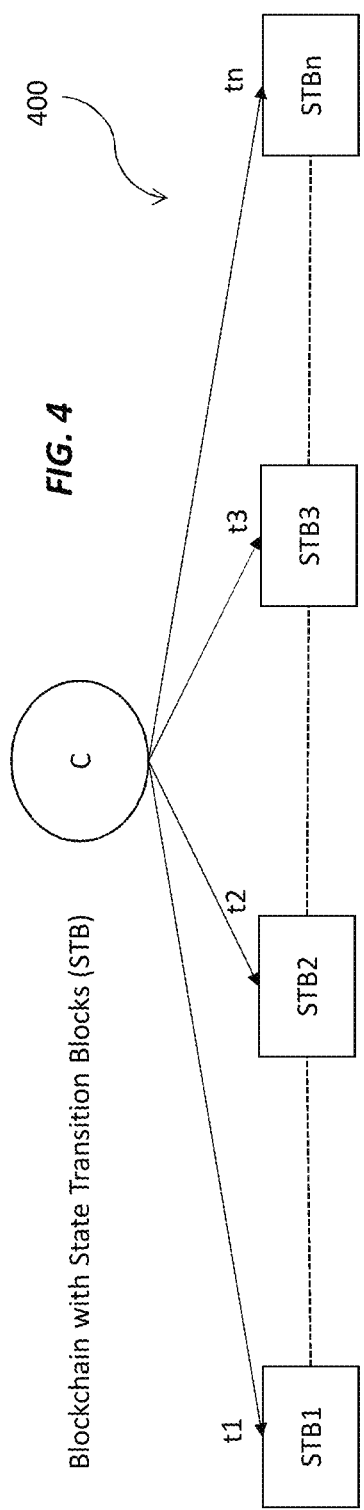
FIG. 4 illustrates a state transition blockchain generated in accordance one embodiment of the invention

Referring now to FIG. 4 of the drawings, reference numeral 400 generally indicates a blockchain with STBs based on ticks t1, t2, . . . tn are issued issued by the counter C of FIG. 3.

Figure 6:
FIGS. 5-6 illustrate examples of finite blockchains in accordance with one embodiment of the invention.
Figure 5:
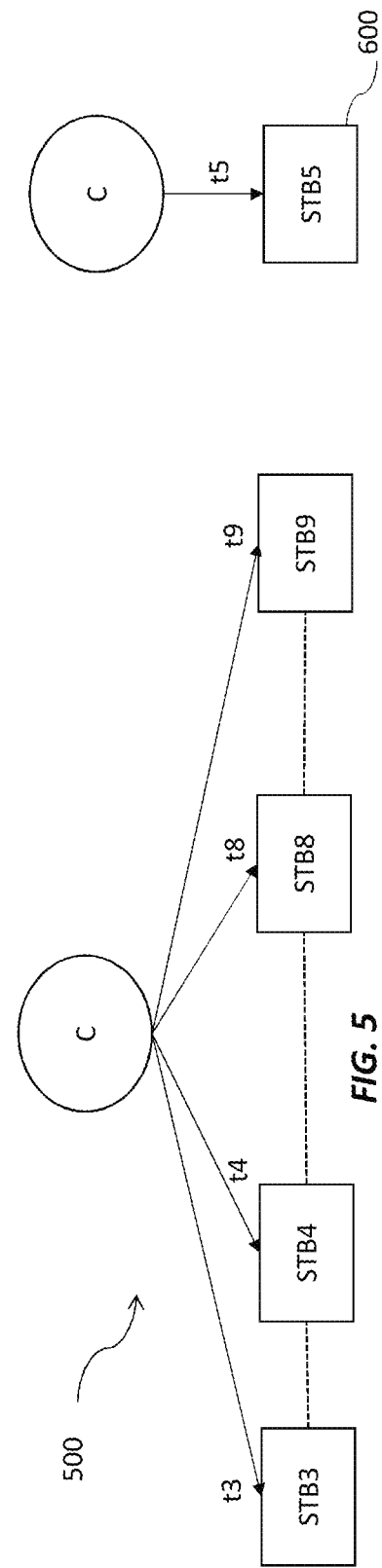

FIG. 5 is a schematic drawing showing a FBC 500 created based on ticks t3 to t9 issued by the counter C. It is possible that a FBC may comprise a single block as in the case of the block 600 issued based on a tick t5 by the counter C as can be seen in in FIG. 6.

Figure 2B:
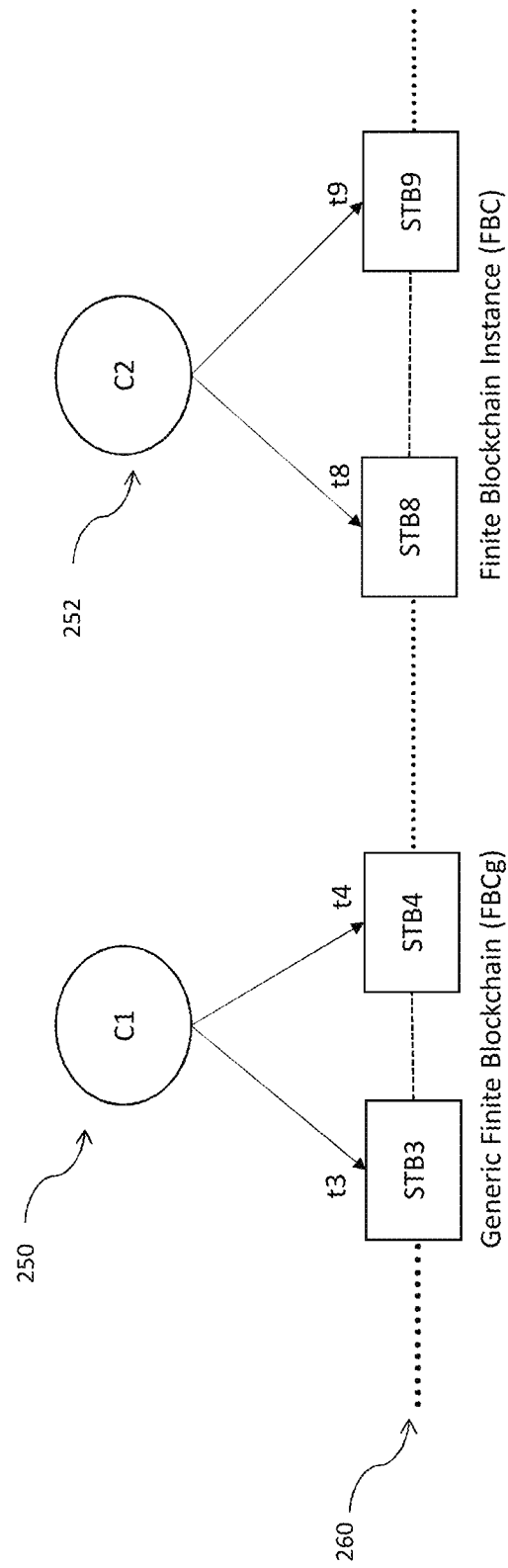
FIG. 2B illustrates how a family of blockchains may be created based on a single blockchain, in accordance with one embodiment of the invention.

Thus far, a generic blockchain and various instances of said generic blockchain that together defining a family have been described as being created as separate blockchains. However, in accordance with the other embodiments, this need not be the case as it is possible to create a family of blockchains from a single blockchain as is illustrated in FIG. 2B of the drawings. Referring to FIG. 2B this time, a generic finite blockchain 250 and its instances (here only a single instance 252 shown) are implemented on the blockchain 260. Thus, an entire blockchain family may be created on a single blockchain.

Figure 7:
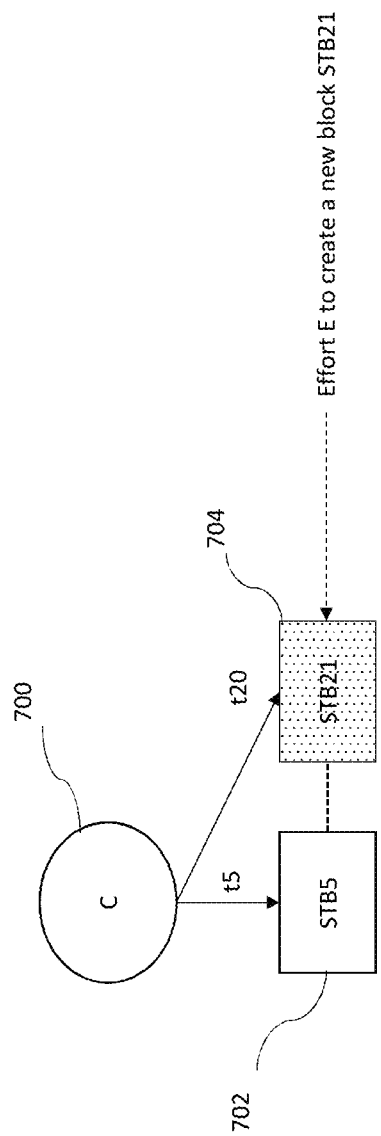
FIG. 7 illustrates a process to add a new state transition block to a finite blockchain, in accordance with one embodiment of the invention.

FIG. 7 illustrates a process for the creation of a new STB, in accordance with one embodiment of the invention. Referring to FIG. 7, reference numeral 700 indicates a counter C associated with a particular blockchain. Reference numeral 702 indicates STB5 which was created based on a tick t5 from the counter 700. The drawing illustrates that in order to create a new block STB21 indicated by reference numeral 704, at a time given by tick t20, a certain effort E is required.

Figure 8:
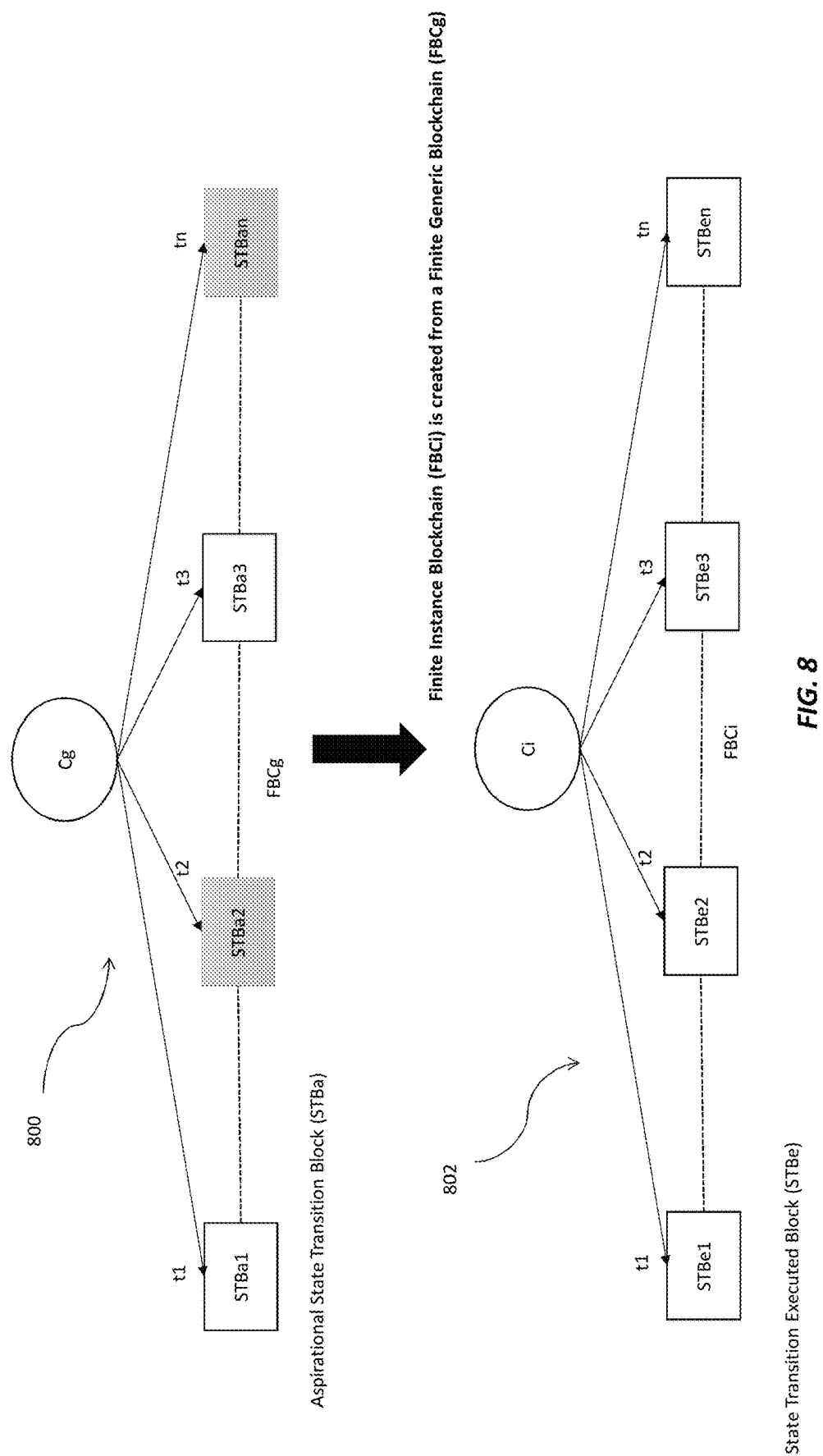
FIG. 8 illustrates the creation of a instance blockchain from a generic finite blockchain, in accordance with one embodiment of the invention.

Referring now to FIG. 8 of the drawings, there is shown a schematic representation of an instance 802, of a finite blockchain created based on a generic finite blockchain 800, in accordance with the techniques disclosed herein.

For purposes of determining equivalence between blocks across multiple chains, the actual time of a tick associated with a particular block is not important. Instead, to determine equivalence it is necessary to identify the blocks with the same relative tick position within the set of ticks associated with each blockchain instance. The ticks associated with a particular blockchain define an ordered set. In one embodiment, a base counter shifting operation is provided in order to provide a basis to determine equivalence between state transition blocks (a concept that will be described more fully below) occurring across multiple blockchain instances. In other words, for a given counter C1 associated with a particular finite blockchain FBC the state transitions referencing said counter C1 may be expressed as FBC (Counter=C1)=(STB0(C1.t0)+STB1(C1.t1)+ . . . +STBn(C1.tn)) where FBC.C represents counter and FBC.C.t represents a tick. Thus, base counter shifting facilitates a transformation FBC (counter=C1)→FBC (counter=C2).

It will be appreciated that through base counter shifting, equivalent state transition blocks across multiple blockchain instances may be identified. For example, the statement FBC1.C.t1=FBC2.C.t2=FBCn.C.tn . . . may be used to map equivalent blocks across blockchain instances. In one embodiment, such a statement defines a tick alignment record.

In one embodiment, an "Alignment block" may be used to record the alignment of one or more blocks STB1, STB2 etc. where STB1, STB2 are respective members of the chains FBC1, FBC2 . . . The Alignment blocks may be created with authorization from the state transition counter with a tick t and an associated time T. In one embodiment Alignment blocks may be associated with each the participating instance blockchains FBC1, FBC2 . . . In one embodiment, each Alignment block (STBalg) may include a tick alignment record. An alignment record may be represented as: STBalg=(FBC1(counter=C1).STB1, FBC2(counter=C2).STB2 . . . )

In one embodiment, an alignment function may be used to uncover a functional equivalence between blocks across multiple instances of blockchains which may represented by a function F (FBC1.STB1, FBC2.STB2 . . . ), in one embodiment, that aligns FBC1.STBi and FBC2.STBj . . . given validating parameters. i.e. in other words F (FBC1.STBi, FBC2.STBj, . . . , STBi.{parameters}, STBj.{parameters})={FBC1.STBalg1, FBC2.STBalg2}.

In one embodiment, a state transition aspirational block may be defined as an aspired to or expected transition in a process. Thus, a generic FBC may be defined as a blockchain with chain of aspirational blocks {STBa}.

An instance FBCi may be regarded as a base counter shifted FBCg.

Referring again to FIG. 2A, it will be seen that the instance blockchain 214 includes blocks 216 to 228. The blocks 216 to 228 have been fully executed and are thus labeled as STBe1, STBe2, etc. The blocks 216 and 218 are aligned with the block 204 in the generic blockchain 202, the block 220 is aligned with the block 206, the blocks 224 and 226 are aligned with the block 208, the block 222 is aligned with the block 210, and the block 228 is aligned with the block 212. Thus, it will be seen that each block in the generic FBC 202 is aligned with equivalent blocks in the instance 214. Since all blocks in the generic FBC 202 have been completed in the instance 214, and the blocks between the chains 202 and 214 are aligned, the blockchain 214 may be described as a completely aligned executed instance of the generic FBC 202. It should be noted that the block 204 in the generic blockchain 202 is a means block and is aligned with two blocks (blocks 216 and 218) in the instance blockchain 214. Likewise, the block 208 in the generic blockchain 202 is a means block and is aligned with two blocks (the blocks 224, 226) in the instance blockchain 214.

By way of further example, reference numeral 230 indicates another example of a completely aligned executed instance comprising executed blocks to 232 to 240. For purposes of alignment (equivalence), the block 232 is aligned with or equivalent to the block 204, the block 234 is aligned with the block 206, the block 236 is aligned with the block 208, the block 238 is aligned with the block 210, and the block 240 is aligned with the block 212.

FIG. 2A also shows a blockchain 240 which represents an active instance of the generic blockchain 202 which is similar to aligned instances 214 and 230 except that the blockchain 240 also includes a block 244 which represents a state transition promised block (STBp). A promised block is an Ends block that exists in a generic blockchain, but not in an active instance. An active instance may be represented in terms of promised blocks as FBCia={STBe}+{STBp}.

A completely aligned instance (FBCiae) is an instance where {STBp} is a null set, there exists {STBe} blocks for all STBg.{Ends}, and there exists Alignment blocks {STBalg} for all blocks in {STBe}.

Figure 9:
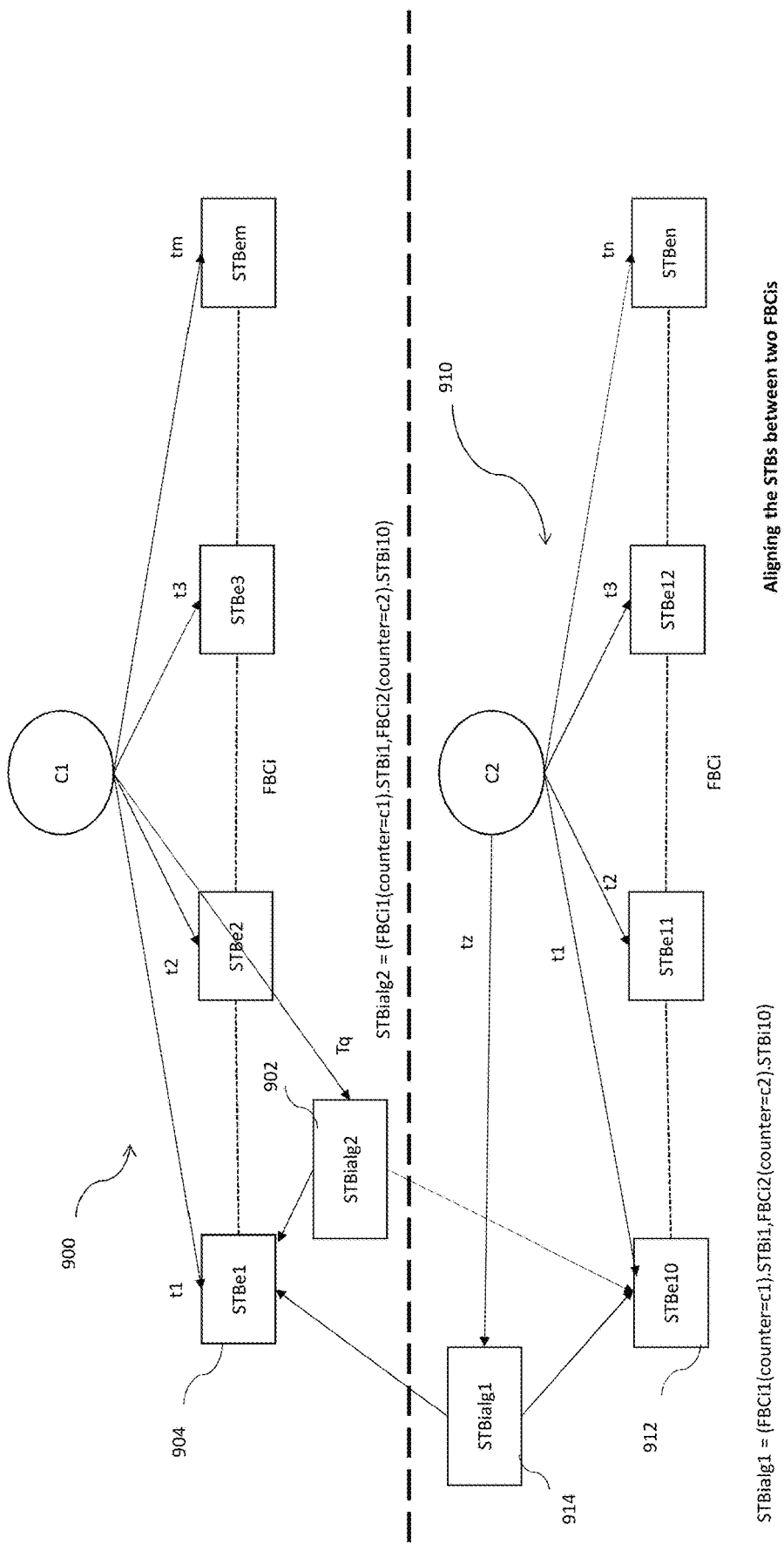
FIG. 9 illustrates how an alignment blocks may be used to align equivalent blocks occurring in one or more finite blockchain instances, in accordance with one embodiment of the invention

In one embodiment, alignment records may be used to align equivalent blocks from two finite instance blockchains that were created based on the same generic finite blockchain. This is illustrated in FIG. 9 of the drawings which shows an instance FBC 900 comprising an alignment block 902 that indicates that the block 904 is equivalent to the block 912 occurring in instance 910. As will be seen, the instance 910 also includes an alignment block 914 to indicate that the block 912 in instance 910 is equivalent to the block 904 in the instance 900. It will be appreciated that an alignment block may be constructed for each of the blocks in the instances 900 and 910 to indicate the equivalence between each of the blocks in said instances.

Figure 10:
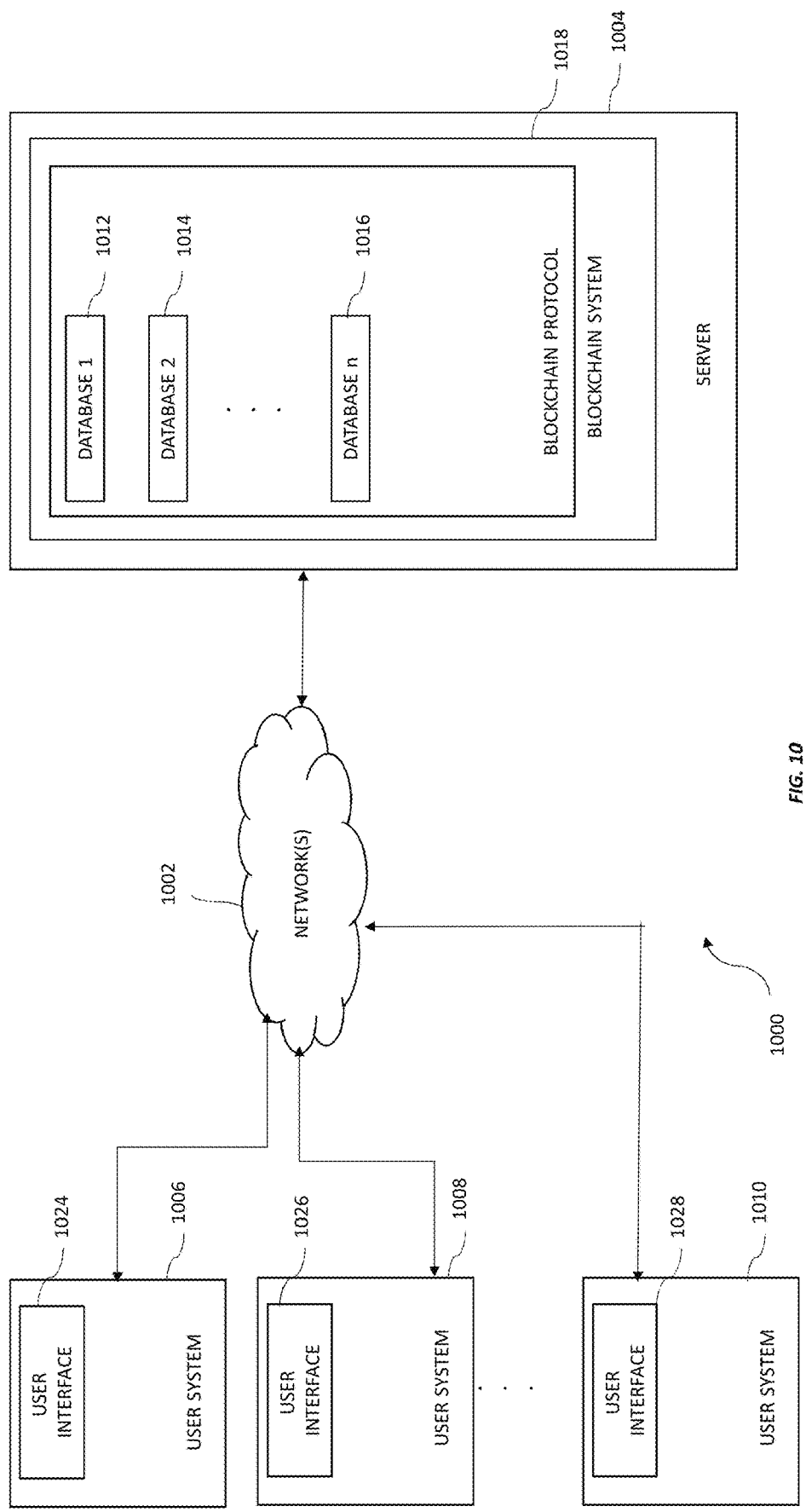
FIG. 10 illustrates a network environment, for practicing embodiments of the present invention.

FIG. 10 shows a block diagram illustrating one example of an operating environment blockchain system 1000 according to one example of the present invention.

The operating environment of FIG. 10 may be a cloud computing environment or a non-cloud computing environment, in accordance with various embodiments. In a cloud computing environment, various embodiments of the present invention discussed below are provided as a service. FIG. 10 illustrates one or more networks 1002 that, in one example, can include wide area networks, local area networks, wireless networks, and/or the like. The environment 1000 includes a plurality of information processing systems 1004, 1006, 1008, 1010 that are communicatively coupled to the network(s) 1002. The information processing systems 1004, 1006, 1008, 1010 include one or more servers 1004 and one or more user systems 1006, 1008, 1010. The user systems 1006, 1008, 1010 can include, for example, information processing systems such as desktop computers, laptop computers, tablet-based computers, wireless devices such as mobile phones, personal digital assistants, and the like.

FIG. 10 further illustrates as part of the server system 1004, a blockchain system 1024 communicating with one or more databases 1012, 1014, 1016 using a blockchain protocol and communicatively coupled to the network 1002.

In accordance with one embodiment, the finite blockchains described may be stored in the databases 1012-1016. The information processing systems 1004, 1006, 1008, 1010 may represent computing devices within an organization that produce change evidence data that evidences that a particular process step mapped to a finite generic blockchain has been completed. In one embodiment, the information processing systems 1004, 1006, 1008, 1010 may be configured to the report the change evidence data to the blockchain system 1004.

In accordance with the various embodiments, the change evidence data may include verifiable data that a particular process step has been successfully completed or executed. Examples of change evidence data may include completion of a particular step in a drug approval process, approval of an order for raw materials needed in a manufacturing process, confirmation of shipment of units manufactured, etc.

In one embodiment, to create state transition blocks based on the change evidence data, the blockchain system 1024 may create two kinds of records: transactions and blocks. Transactions are the actual data stored in the blockchain. In one example, the data in each block represents a single transaction. In another example, data in each block represents more than on transaction that is dividable into sections within each block. In one embodiment, the transactions may be created by users or participants using the system.

The blocks are recorded that confirm when and in what sequence certain transaction become journaled at back of the blockchain database.

Figure 11:
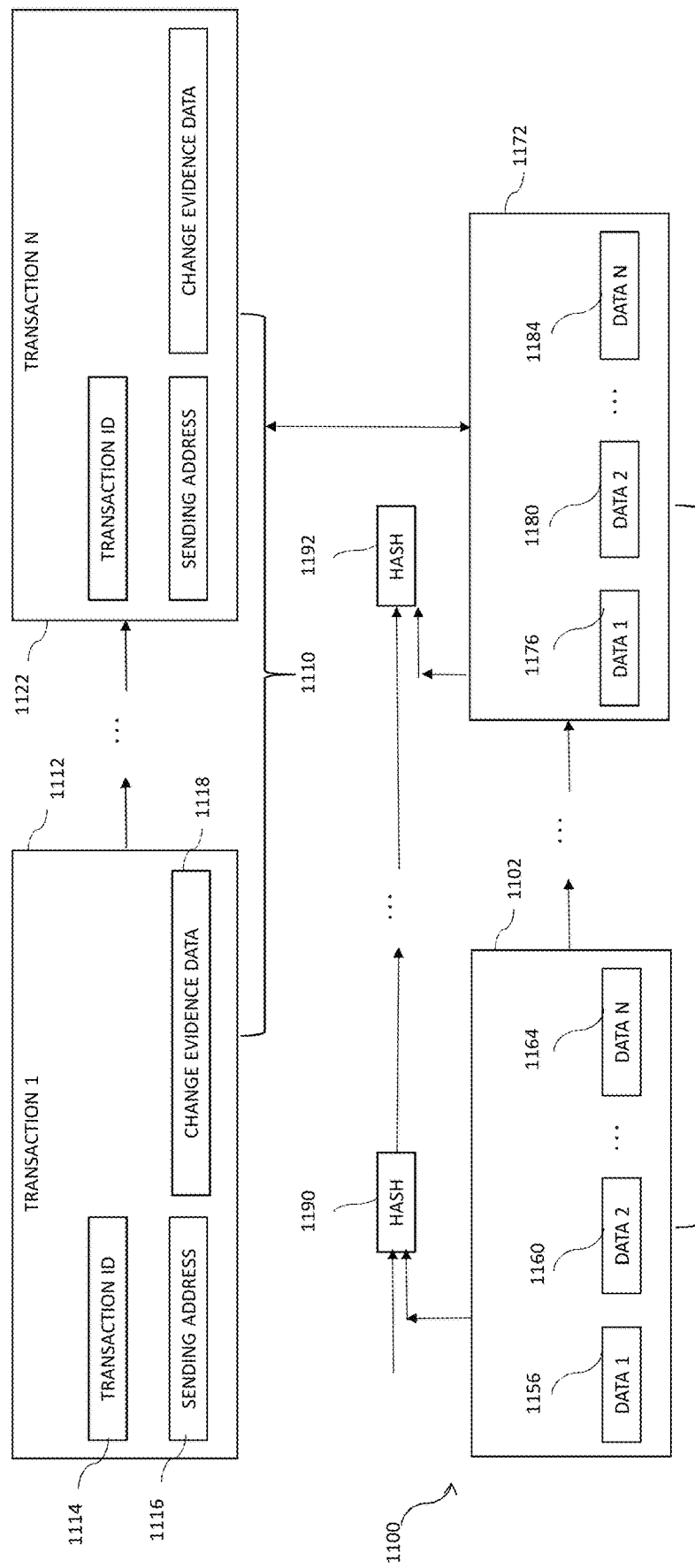
FIG. 11 illustrates the creation of blocks including state changes (change evidence data), in accordance with one embodiment of the invention.

FIG. 11 is a functional diagram for a blockchain 1150 illustrating details of each block, in accordance with one embodiment of the invention. Shown are record blocks 1102 and 1172 and transactions 1110. The transactions 1110 are actual data stored in the blockchain 1172. The blocks 1110 are records of transactions. In this example transactions 1110 are all associated with block 1172. For e.g. transaction 1112 is stored inside block 1172 as 1176.

Record blocks 1110 represent a series of transactions 1112 through 1122 as shown for transactions 1 through transaction n, respectively. Each transaction 1110 typically includes a transaction ID 1114, sending address 1111, and state change information 1115.

A hash function 1190 and 1192 is shown as part of the record blocks 1150. In one implementation of a blockchain the previous hash function is input to a subsequent hash function 1192, along with the transaction block 1172 as shown. This ensures that there has been no tampering or alteration of the data in the record blockchain.

Figure 12:
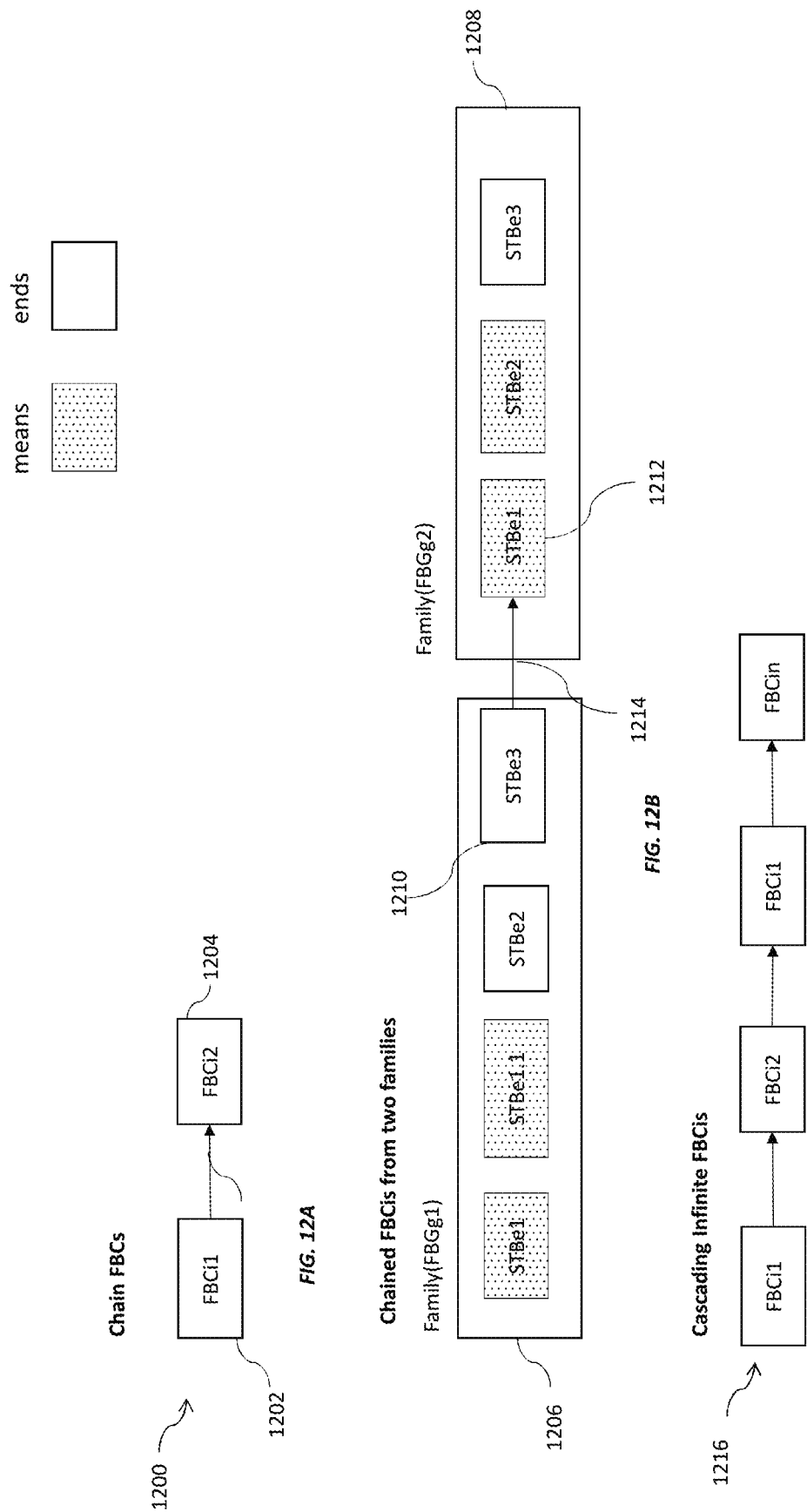
FIGS. 12A-12C illustrate how finite blockchain instances may be cascaded, in accordance with one embodiment of the invention.

In one embodiment, two FBCs, FBC1 and FBC2 may be linked or chained such that the final or ending block of FBC1 is linked to the starting or beginning block of FBC2. A chain of {FBC1, FBC2 . . . } thus can form a long chain of FBCs. This is illustrated in FIG. 12A of the drawings where reference numeral 1200 generally indicates a cascading blockchain arrangement comprising finite blockchain instance 1202 which is chained or linked to finite blockchain instance 1204 by means of a linkage 1206 which indicates that the ending block of the chain covered 1202 connected to the beginning block of the chain 1204.

Given two FBCis FBCi1 and FBCi2 belonging to two families, cascading or chaining of FBCi1 to FBCi2 comprises connecting the end state transition block of FBCi1 to the start of FBCi2. For two FBCgs FBCg1 and FBCg2 belonging to two families, cascading or chaining of FBCg1 to FBCg2 comprises connecting the end state transition block of FBCg1 to the start of FBCg2. For example, consider FIG. 12B of the drawings where 1206 indicates a first blockchain family which is chained to a second blockchain family by means of a linking or chaining relationship 1214 which specifies that the ending block 1210 from the first family blockchain 1206 is linked all connected to the starting block 1212 of the second blockchain family 1208.

In one embodiment, an infinite sequence of cascading blockchains may be constructed. FIG. 12C shows an infinite sequence 1216 of cascading blockchains.

In a general sense, given FBCis FBCi1, FBCi2, . . . , FBCn belonging to n families, cascading or chaining of FBCi1 to FBCi2 to FBCi to FBCn comprises connecting the end state transition block of each FBCi to the start of FBCi+1.

In one embodiment, a finite blockchain may require requires n ticks to execute starting with a start tick ts and ending with an end tick te. The number of ticks required for executing an FBC may then be specified as FBC.numticks. Thus, chained FBC may require FBC1.numticks+ FBC2.numticks etc. for complete execution. Assuming that ts occurred at Time Ts and te occurred at time Te the optimization required is Te−Ts⇐To where To is the optimal time. A chained FBC of two FBCs FBC1 and FBC2 laid out serially will therefore take Time for FBC.numticks+Time for FBC2.numticks. Given a Time To for optimal time, therefore parallelization can be:

FBC1(ts1, te1) and FBC2(ts2, te2)
Serialized: ts2>te1
Parallelized: ts2<te1

$(te2-ts1)<(T0).$

Figure 13:
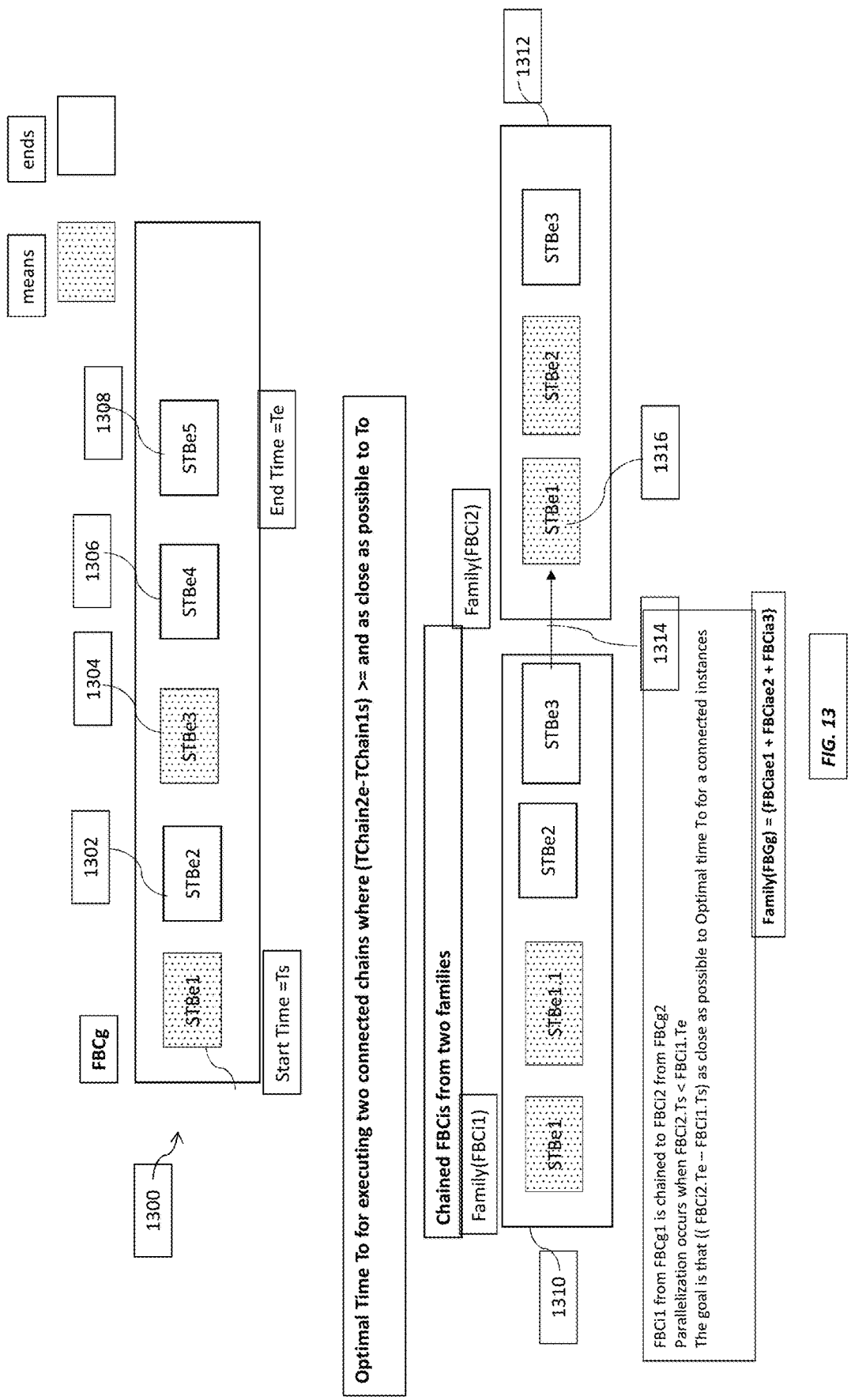
FIG. 13 illustrates how cascading of blockchains may reduce the overall execution time of processes, in accordance with one embodiment of the invention

FIG. 13 of the drawings illustrates an example of achieving parallelization in process execution in accordance with one embodiment of the invention. Referring to FIG. 13A, reference 1300 generally indicates a generic finite blockchain comprising a sequence of blocks including a starting block 1302 and ending block 1304. FIG. 13B shows a finite blockchain instance 1310 which is chained to a finite blockchain instance 1312 by means of a linking arrangement 1314. The blockchain instance 1310 may be based on a generic finite blockchain FBCg1 1300 and the blockchain instance 1312 may be based on FBCg2 (not shown). Parallelization occurs when FBCi2.Ts<FBCi1.Te. In one embodiment, full process optimization, the goal may be to make the difference (FBCi2.Te−FBCi1.Ts) as close as possible to Optimal time To for connected (linked) instances. The linking arrangement 1314 links the block STBe3 (which is aligned with the block 1304 in the generic blockchain 1300) to the starting block 1316 in the finite blockchain 1312. In other words, the finite blockchain instance 1312 starts executing before complete execution of the blockchain 1310 (blocks aligned in the blockchain instance 1310 that are aligned with blocks 1306 and 1308 in the generic finite blockchain 1300 are yet to execute). This reduces overall execution time and achieves parallel execution of processes.

Figure 14:
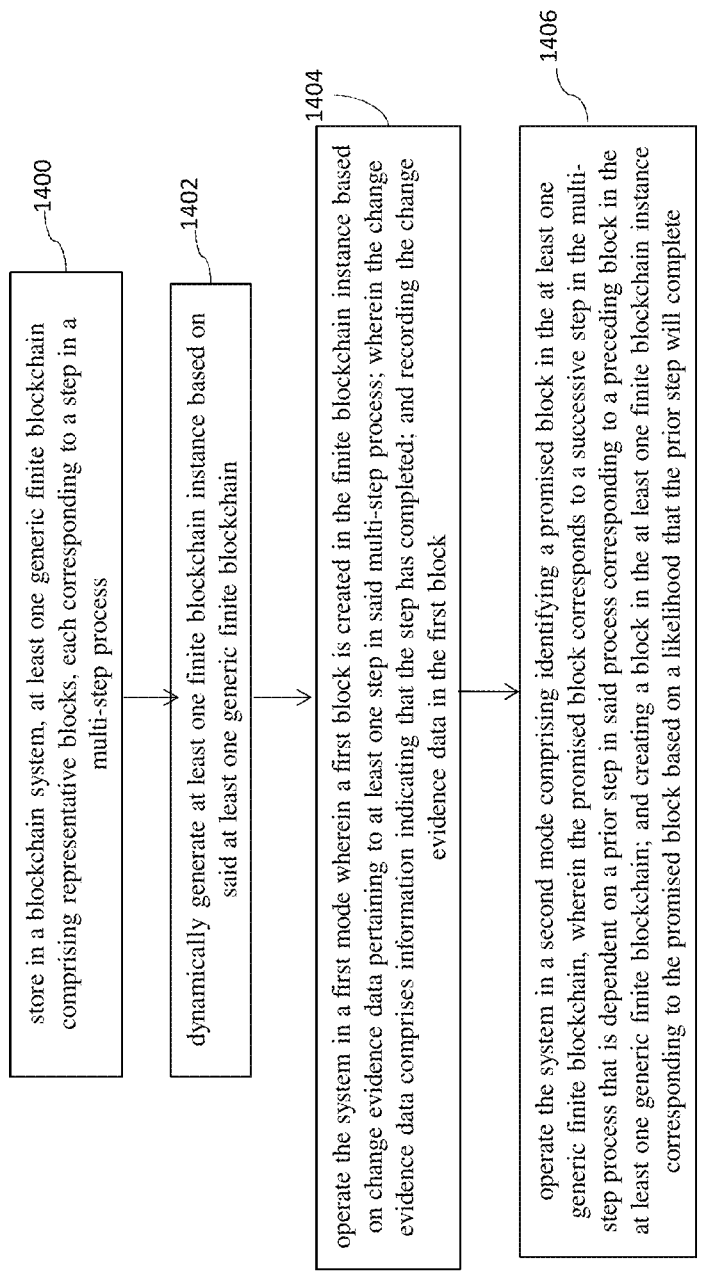
FIG. 14 illustrates a flowchart of operations performed corresponding two modes of operations for blockchain systems, in accordance one embodiment of the invention.

In one embodiment, the inventive blockchain systems described herein may have two modes of operation. In a first mode, blocks are added to a finite blockchain instance based on change evidence data, whereas in a second mode blocks are added based on a promised block in the generic blockchain on which said finite blockchain instances based. Referring now to FIG. 14 of the drawings there is shown a flowchart of operations performed based on said two modes of operation. As will be seen, at block 1400 to blockchain system stores at least one generic finite block chain comprising representative blocks, each corresponding to a step in a multi-step process. At block 1402, the system dynamically generates at least one finite block chain instance based on the at least one generic finite block chain. At block 1404, the system operates in the first mode wherein the first block is created in the finite block chain instance based on change evidence data pertaining to at least one step in said multi-step process. As noted above, the change evidence data may comprise information that a particular step in the multi-step process has completed. At block 1404, the system also records the change evidence data in the first block. At block 1406, the system operates in the second mode comprising identifying a promised block in the at least one generic finite block chain; and creates a block in the at least one finite block chain instance corresponding to said promised block. In one embodiment, the promised block is created based on a likelihood that the prior step will complete. In one embodiment, the promised block may correspond to a successor step in the multi-step process that is dependent on a prior step in the process which corresponds to a preceding block in the at least one generic finite block chain. In one embodiment, the likelihood that the prior step complete may be based on an algorithm.

Figure 15:
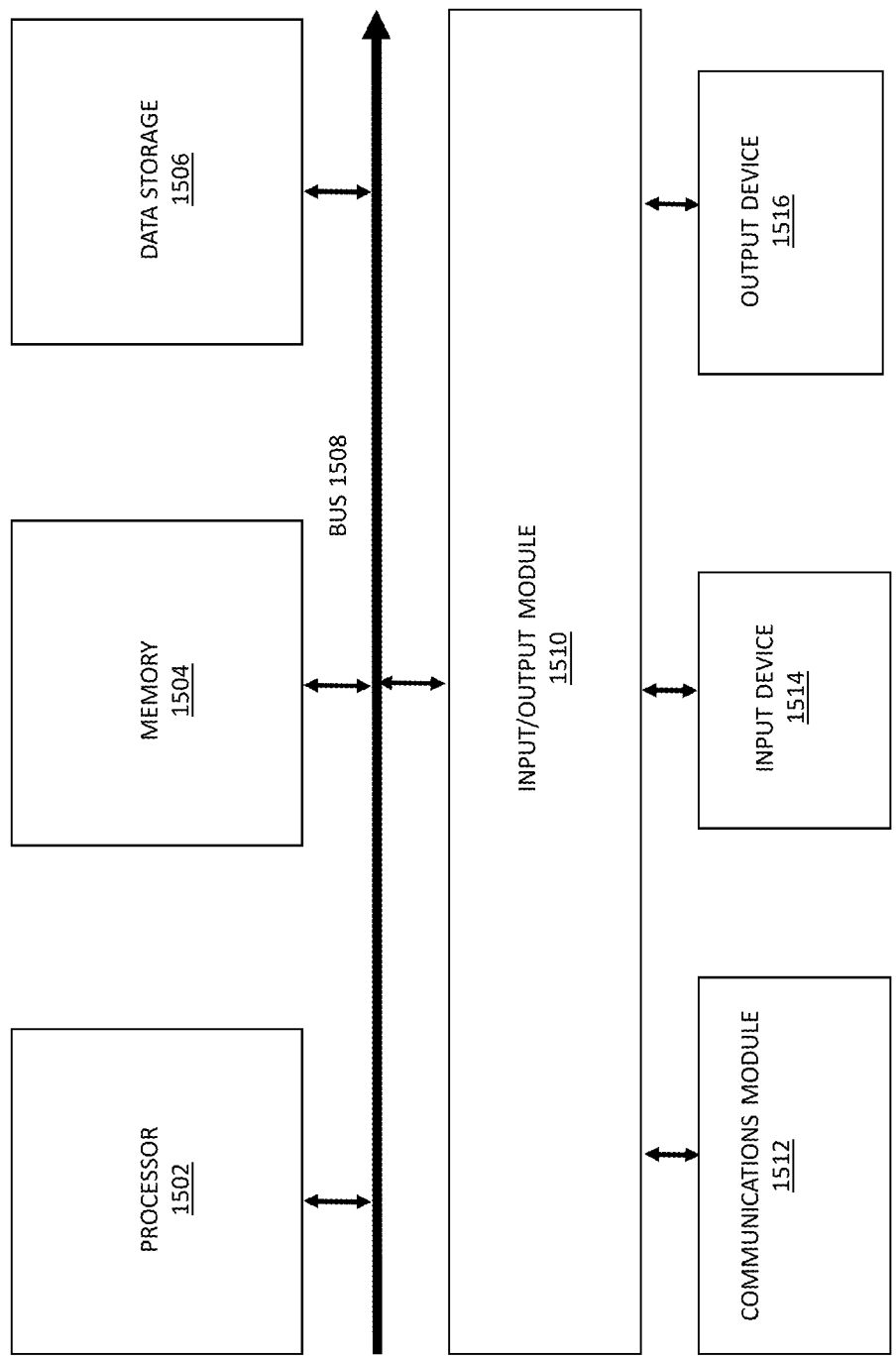
FIG. 15 shows a high-level block diagram of the present of the hardware that may be used to practice aspects of the present invention.

FIG. 15 is a block diagram illustrating exemplary hardware for executing some of the techniques disclosed herein, in accordance with one embodiment of the invention. In certain aspects, the computer system 1700 may be implemented using hardware or a combination of software and hardware, either in a dedicated server or integrated into another entity or distributed across multiple entities.

Computer system 1500 (e.g., client or server) includes a bus 1508 or other communication mechanism for communicating information, and a processor 1402 coupled with bus 1508 for processing information. According to one aspect, the computer system 1500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 1500 may be implemented with one or more processors 1502. Processor 1502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 1500 can include, in addition to hardware, code that creates an execution environment for the computer program in question, e.g., code that constitutes processor firmware, a protocol stack, a database management system, an operating system, or a combination of one or more of them stored in an included memory 1504 such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 11508 for storing information and instructions to be executed by processor 1502. The processor 1502 and the memory 1504 can be supplemented by, or incorporated in, special purpose logic circuitry. Expansion memory may also be provided and connected to computer system 1500 through input/output module 1510, which may include, for example, a SIMM (Single in Line Memory Module) card interface. Such expansion memory may provide extra storage space for computer system 1500 or may also store applications or other information for computer system 1500. Specifically, expansion memory may include instructions to carry out or supplement the processes described above and may include secure information also. Thus, for example, expansion memory may be provided as a security module for computer system 1500 and may be programmed with instructions that permit secure use of computer system 1500. In addition, secure applications may be provided via the SIMM cards, along with additional information, such as placing identifying information on the SIMM card in a non-hackable manner.

The instructions may be stored in the memory 1504 and implemented in one or more computer program products, i.e., one or more modules of computer program instructions encoded on a computer readable medium for execution by, or to control the operation of, the computer system 1500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, embeddable languages, and xml-based languages. Memory 1504 may also be used for storing temporary variable or other intermediate information during execution of instructions to be executed by processor 1502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1570 further includes a data storage device 1506 such as a magnetic disk or optical disk, coupled to bus 1508 for storing information and instructions. Computer system 1500 may be coupled via input/output module 1510 to various devices. The input/output module 1510 can be any input/output module. Example input/output modules 1510 include data ports such as USB ports. In addition, input/output module 1510 may be provided in communication with processor 1502, so as to enable near area communication of computer system 1700 with other devices. The input/output module 1510 may provide, for example, for wired communication in some implementations, or for wireless communication in other implementations, and multiple interfaces may also be used. The input/output module 1510 is configured to connect to a communications module 1512. Example communications modules 1512 include networking interface cards, such as Ethernet cards and modems.

The components of the system can be interconnected by any form or medium of digital data communication, e.g., a communication network. The communication network (e.g., network 1002) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like.

For example, in certain aspects, communications module 1512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI or other such transceiver.

In any such implementation, communications module 1512 sends and receives electrical, electromagnetic or optical signals that carry digital data streams representing various types of information. The network link typically provides data communication through one or more networks to other data devices. For example, the network link of the communications module 1512 may provide a connection through local network to a host computer or to data equipment operated by an Internet Service Provider (ISP). The ISP in turn provides data communication services through the world-wide packet data communication network now commonly referred to as the Internet. The local network and Internet both use electrical, electromagnetic or optical signals that carry digital data streams. The signals through the various networks and the signals on the network link and through communications module 1512, which carry the digital data to and from computer system 1500, are example forms of transmission media.

Computer system 1500 can send messages and receive data, including program code, through the network(s), the network link and communications module 1512. In the Internet example, a server might transmit a requested code for an application program through Internet, the ISP, the local network and communications module 1510. The received code may be executed by processor 1502 as it is received, and/or stored in data storage 1506 for later execution.

In certain aspects, the input/output module 1510 is configured to connect to a plurality of devices, such as an input device 1512 (e.g., input device 1514) and/or an output device 1514 (e.g., output device 1514). Example input devices 1512 include a stylus, a finger, a keyboard and a pointing device, e.g., a mouse or a trackball, by which a user can provide input to the computer system 1500. Other kinds of input devices 1512 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1514 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 1514 may comprise appropriate circuitry for driving the output device 1514 to present graphical and other information to a user.

According to one aspect of the present disclosure, the user systems and the server shown in FIG. 15 can be implemented using a computer system 1500 in response to processor 1502 executing one or more sequences of one or more instructions contained in memory 1504. Such instructions may be read into memory 1504 from another machine-readable medium, such as data storage device 1506. Execution of the sequences of instructions contained in main memory 1504 causes processor 1502 to perform the process steps described herein. One or more processors in a multi-processing arrangement may also be employed to execute the sequences of instructions contained in memory 1504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 1500 can include clients and servers. A client and server are generally remote from each other and typically interact through a communication network. The relationship of client and server arises by virtue of computer programs running on the respective computers and having a client-server relationship to each other. Computer system 1500 can be, for example, and without limitation, a desktop computer, laptop computer, or tablet computer. Computer system 1500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 1506. Volatile media include dynamic memory, such as memory 1504. Transmission media include coaxial cables, copper wire, and fiber optics, including the wires that comprise bus 1508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 1508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

To illustrate the interchangeability of hardware and software, items such as the various illustrative blocks, nodules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of B, and C" or "at least one of A, B, or C" each refer to only A, only B, or only C; any combination of A, B, and C; and; or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of Whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method, comprising:
    storing, in a blockchain system, at least one generic finite blockchain comprising representative blocks, each corresponding to a step in a multi-step process;
    dynamically generating at least one finite blockchain instance based on said at least one generic finite blockchain;
    operating the system in a first mode wherein a first block is created in the finite blockchain instance based on change evidence data pertaining to at least one step in said multi-step process; wherein the change evidence data comprises information indicating that the step has completed; and recording the change evidence data in the first block; and
    operating the system in a second mode comprising identifying a promised block in the at least one generic finite blockchain, wherein the promised block corresponds to a successive step in the multi-step process that is dependent on a prior step in said process corresponding to a preceding block in the at least one generic finite blockchain; accessing data for the creation of a block in the at least one blockchain instance and comparing said data with data associated with the promised bock in the generic block chain and creating a block in the at least one finite blockchain instance corresponding to the promised block when said comparing indicates a likelihood that the prior step will complete.

2. The computer-implemented method of claim 1, further comprising receiving input on the likelihood.

3. The computer-implemented method of claim 1, further comprising associating an effort with each block in the generic, where the effort represents the resources needed to complete the step associated with the block.

4. The computer-implemented method of claim 3, wherein the effort is measured in terms of the resources comprising at least one of money and labor.

5. The computer-implemented method of claim 3, further comprising releasing the effort.

6. The computer-implemented method of claim 1, wherein the likelihood is computed based on an algorithm.

7. A system, comprising:
    a memory;
    a processor communicatively coupled to the memory, wherein the processor is configured to perform:
        storing, in a blockchain system, at least one generic finite blockchain comprising representative blocks, each corresponding to a step in a multi-step process;
    dynamically generating at least one finite blockchain instance based on said at least one generic finite blockchain;
    operating the system in a first mode wherein a first block is created in the finite blockchain instance based on change evidence data pertaining to at least one step in said multi-step process; wherein the change evidence data comprises information indicating that the step has completed; and recording the change evidence data in the first block; and
    operating the system in a second mode comprising identifying a promised block in the at least one generic finite blockchain, wherein the promised block corresponds to a successive step in the multi-step process that is dependent on a prior step in said process corresponding to a preceding block in the at least one generic finite blockchain; accessing data for the creation of a block in the at least one blockchain instance and comparing said data with data associated with the promised bock in the generic block chain and creating a block in the at least one finite blockchain instance corresponding to the promised block when said comparing indicates a likelihood that the prior step will complete.

8. The system of claim 7, further comprising receiving input on the likelihood.

9. The system of claim 7, further comprising associating an effort with each block in the generic, where the effort represents the resources needed to complete the step associated with the block.

10. The system of claim 9, wherein the effort is measured in terms of the resources comprising at least one of money and labor.

11. The system method of claim 9, further comprising releasing the effort.

12. The system of claim 7, wherein the likelihood is computed based on an algorithm.

13. A non-transitory computer program product comprising a computer-readable storage medium having computer readable program code embodied therewith, the computer readable program code configured to perform:

storing, in a blockchain system, at least one generic finite blockchain comprising representative blocks, each corresponding to a step in a multi-step process;

dynamically generating at least one finite blockchain instance based on said at least one generic finite blockchain;

operating the system in a first mode wherein a first block is created in the finite blockchain instance based on change evidence data pertaining to at least one step in said multi-step process; wherein the change evidence data comprises information indicating that the step has completed; and recording the change evidence data in the first block; and operating the system in a second mode comprising identifying a promised block in the at least one generic finite blockchain, wherein the promised block corresponds to a successive step in the multi-step process that is dependent on a prior step in said process corresponding to a preceding block in the at least one generic finite blockchain; accessing data for the creation of a block in the at least one blockchain instance and comparing said data with data associated with the promised bock in the generic block chain and creating a block in the at least one finite blockchain instance corresponding to the promised block when said comparing indicates a likelihood that the prior step will complete.

14. The non-transitory computer program product of claim 13, further comprising associating each of the first and second block chain instances to a corresponding generic finite blockchain.

15. The non-transitory computer program product of claim 13, further comprising receiving input on the likelihood.

16. The non-transitory computer program product of claim 13, further comprising associating an effort with each block in the generic, where the effort represents the resources needed to complete the step associated with the block.

17. The non-transitory computer program product of claim 16, wherein the effort is measured in terms of the resources comprising at least one of money and labor.

18. The non-transitory computer program product of claim 16, further comprising releasing the effort.

19. The computer-implemented method of claim 13, wherein the likelihood is computed based on an algorithm.

* * * * *